US011911788B2

(12) United States Patent
Pugh et al.

(10) Patent No.: US 11,911,788 B2
(45) Date of Patent: Feb. 27, 2024

(54) METHOD AND APPARATUS FOR IMPROVED TUMBLER SUPPORT

(71) Applicants: Zoey Pugh, Orange Park, FL (US); Randall Pugh, Orange Park, FL (US)

(72) Inventors: Zoey Pugh, Orange Park, FL (US); Randall Pugh, Orange Park, FL (US)

( * ) Notice: Subject to any disclaimer, the term of this patent is extended or adjusted under 35 U.S.C. 154(b) by 0 days.

(21) Appl. No.: 18/081,187

(22) Filed: Dec. 14, 2022

(65) Prior Publication Data

US 2023/0182167 A1 Jun. 15, 2023

Related U.S. Application Data

(60) Provisional application No. 63/289,190, filed on Dec. 14, 2021.

(51) Int. Cl.
*B05C 13/02* (2006.01)

(52) U.S. Cl.
CPC .................................... *B05C 13/02* (2013.01)

(58) Field of Classification Search
CPC .............................. B05C 13/025; B05C 13/02
USPC ...................................................... 269/47–52
See application file for complete search history.

(56) References Cited

U.S. PATENT DOCUMENTS

| | | | | | |
|---|---|---|---|---|---|
| 1,235,957 | A * | 8/1917 | Bidwell | B23B 31/22 | 451/381 |
| 1,245,361 | A * | 11/1917 | Lutz | B23B 31/404 | 269/52 |
| 1,413,680 | A * | 4/1922 | Pfunder | B23B 31/202 | 279/51 |
| 1,688,424 | A * | 10/1928 | Kiefer | B24B 19/006 | 269/21 |
| 2,167,589 | A * | 7/1939 | Schutz | B05C 1/022 | 118/232 |
| 2,198,565 | A * | 4/1940 | Schutz | B41F 15/0872 | 101/124 |
| 2,215,981 | A * | 9/1940 | Schutz | B28B 11/04 | 118/218 |
| 2,529,331 | A * | 11/1950 | Godfrey | C03B 23/0093 | 279/3 |
| 3,328,042 | A * | 6/1967 | Mallory | C03B 23/0093 | 279/151 |
| 4,267,771 | A * | 5/1981 | Stirbis | B41F 17/22 | 101/475 |
| 4,380,964 | A * | 4/1983 | Abe | B05C 13/025 | 279/3 |
| 4,601,222 | A * | 7/1986 | Gill | B23B 5/162 | 408/82 |
| 4,926,788 | A * | 5/1990 | Metcalf | B41F 17/002 | 118/500 |
| 5,284,229 | A * | 2/1994 | Logan | B05C 13/025 | 118/232 |

* cited by examiner

*Primary Examiner* — Jason L Vaughan
(74) *Attorney, Agent, or Firm* — Tracnik Law PLLC; Joseph P. Kincart

(57) ABSTRACT

Methods and apparatus to quickly and securely fasten a tumbler cup to a spindle turner arm in a consistent and accurate manner. A spindle tumbler arm is inserted into a support body and contacts one or more cams. The cams move a plunger outward forcing a seal against a wall of an interior change securing turner arm against to the tumbler cup. Other embodiments include an expandable bladder placed into the tumbler cup; and a support attached via a threaded connection.

20 Claims, 11 Drawing Sheets

METHOD AND APPARATUS FOR IMPROVED TUMBLER SUPPORT

CROSS REFERENCE TO RELATED APPLICATIONS

This application claims priority to U.S. Provisional Application No. 63/289,190 filed Dec. 14, 2021, the entire disclosure of which is incorporated herein by reference.

FIELD OF THE DISCLOSURE

The present disclosure relates to methods and apparatus for improved support of a tumbler, and more specifically for improved methods and apparatus for securely supporting a tumbler while the tumbler is being turned, such as turning during application of a decorative coating.

BACKGROUND OF THE DISCLOSURE

The lidded tumbler market is expanding as users look for green options that do not result in generation of waste the enters landfills or negatively impacts climate change variables. The U.S. market for tumblers is on track to reach a billion dollars annually by 2023. Younger people in particular seem inclined to use tumblers during various outdoor activities such as camping, hiking, fitness, and travel. The younger demographic is also eager to be expressive and therefore use customized tumblers that help them declare themselves. In another aspect, promotional tumblers are used to reach potential customers during non-blue light hours (hours during which the customer is not engaged in online activities). Accordingly, tumblers may be customized prints, logos, and messages.

Tumblers may have various shapes, including different interior volume shapes, and may include various materials, such as stainless steel, aluminum, plastic, glass, double walled vacuum, coated, and the like. Stainless steel tumblers are increasing growing in popularity. Customization of the various shapes requires that the tumbler be securely supported and often rotated during the customization processes.

Currently the apparatus used for support of the tumbler during customization work is not precise in its ability to align and/or rotate the tumbler with a support shaft during customization processes. Typical support mechanisms are simply a piece of foam stuck onto a piece of pipe with provides inconsistent support and sometimes result in the tumbler becoming dislodged such that the artwork on the tumbler is compromised. In other scenarios, it is difficult to replicate a design due to inconsistencies in the support.

SUMMARY OF THE DISCLOSURE

Accordingly, the present invention provides methods and apparatus to quickly and securely fasten a tumbler cup to a spindle turner arm in a consistent and accurate manner.

Embodiments may include a handle that fixedly attaches to a spindle turner arm and a tumbler cup. In some embodiments, the handle may attach to a rim of the tumbler cup, such as via a treaded portion abutting the rim. The threaded portion may be an interior thread or an exterior thread depending upon the design of the tumbler cup and the spindle turner may be inserted into a concentric opening through the handle. The spindle turner may be secured with a set screw or other fastening device.

In some embodiments, the handle portion may be placed into an interior chamber 106 of a tumbler cup while the handle is in an inactive state. The spindle turner arm is inserted into the handle. As the turner arm is inserted into the handle, plungers contained within plunger channels in the handle are transitioned to an active state and moved outward towards an interior chamber surface of the tumbler.

In some preferred embodiments, seals, such as for example, silicon beads, are pushed by the plungers up against the interior chamber surface thereby fixedly attaching the handle to the interior chamber surface. The spindle turner arm is attached to the handle, and the handle is fixedly attached to the tumbler while the handle is within the interior chamber and in an active state, the spindle is also fixedly attached to the tumbler while the handle is within the interior chamber and in an active state.

By removing the spindle turner arm, the handle may be placed back into an inactive state and disengaged from the tumbler and removed from the interior chamber.

In general, the present invention provides for a tumbler cup support apparatus that includes a tumbler support body having a cylindrical hollow into which a spindle turner arm may be inserted. The plunger may be supported by the tumble support body. The plunger may include a first plunger end directed towards the cylindrical hollow and a second plunger end directed towards a perimeter of the tumbler support body. A cam may be integrated into the first plunger end, the cam being placed in contact with the spindle turner arm when the spindle turner arm is inserted into the cylindrical hollow.

A formable interface may be in contact with the second plunger surface and movable against a surface of an interior chamber of a tumbler cup.

Implementations may include one or more of the following features: a tumbler cup support apparatus additionally having a set screw through the tumbler support body, the set screw adjustable to secure the spindle turner arm to the tumbler support body; the formable interface may include a silicon sphere; a gasket between tumbler support body and the tumbler cup; the tumbler support body may include an upper portion and a lower portion, the lower portion encompassing the plunger and the silicon sphere. The lower portion of the tumbler support body may be fixedly attached to the upper portion of the tumbler support body, such as for example with one or more threaded connectors.

The cam integrated into the first plunger end and the formable interface in contact with the second plunger surface may be replaced with a bladder.

Methods of the present invention may include supporting a tumbler cup placing a tumbler support body and plunger into an interior chamber of the tumbler cup. Supporting may include positioning a seal between the plunger and a surface of the interior chamber. Supporting may furthermore include inserting the spindle turner arm through a cylindrical hollow in the tumbler support body. The cam may contact the spindle turner arm.

Supporting may moreover include pushing the spindle turner arm past the cam causing the plunger to move outward towards a surface of the interior chamber. The plunger may be extended outward, deploying the plunger into an active state and placing the seal into contact with the surface of the interior chamber. Supporting may furthermore include rotating the spindle turner arm, and as a result of the rotating the spindle turner arm, transferring rotational force to the tumbler cup.

In some embodiments, a minimal amount of outward force may be exerted with the plunger such that the seal is placed in contact with the surface of the interior chamber.

The plungers may be removed from an active state by removing the spindle turner arm from the tumbler support body; and reducing that amount of outward force by the seals in contact with the surface of the interior chamber. In some embodiments, each plunger and a respective cam are integrated.

A cam may include a slope surface and the method may include contacting the slope surface with the spindle turner arm and moving the cam outward towards the surface of the interior chamber as a result of the contact of the slope with the spindle turner arm. The tumbler support body may be connected to a handle and the method may additionally include the step of securing the spindle turner aim to the handle and the tumbler support body with a fastener.

In some embodiments, the method may include the step of reproducing a tumbler cup support experience via aligning the tumbler support body to the handle with reference to alignment marks on the handle. Additionally, the methods may include placing a gasket between the tumbler support body and the tumbler cup.

A tumbler support body may include an upper portion and a lower portion, the lower portion encompassing the plunger and the cam, and the method may further include securing the lower portion to the upper portion with one or more screws.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure.

Figure 1:
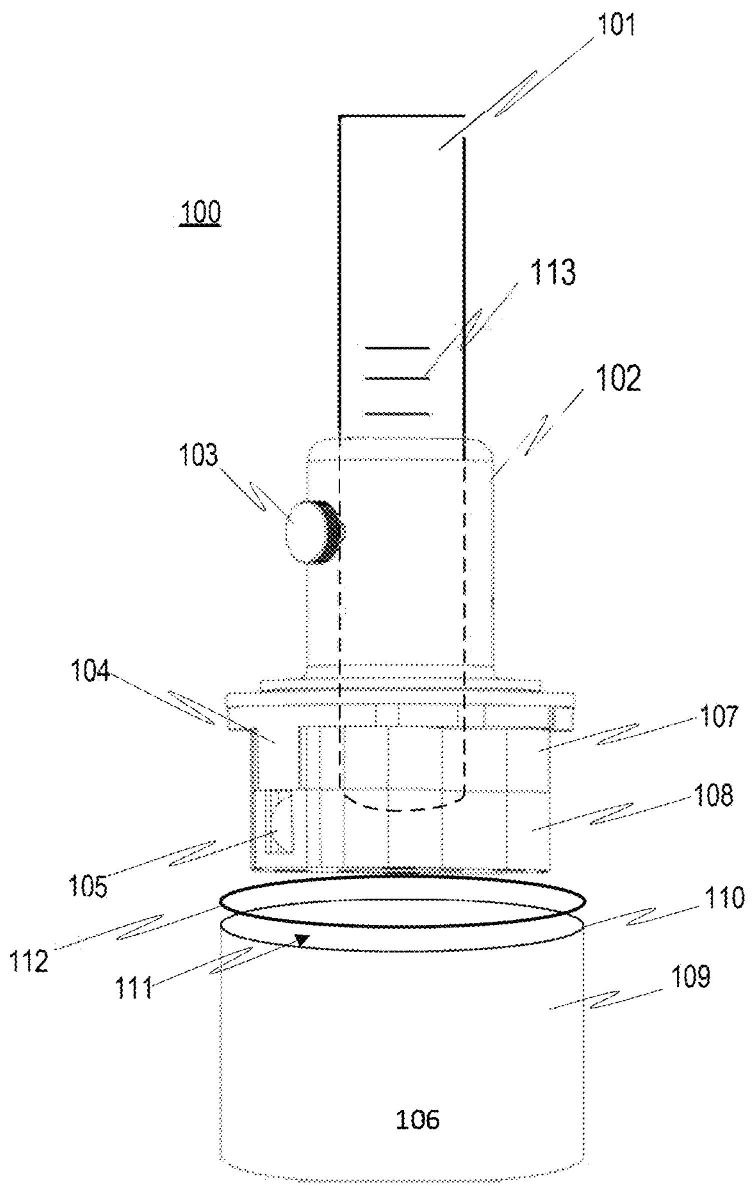
FIG. 1 illustrates an exploded view of an apparatus in accordance with some embodiments of the present invention.

The drawings are not necessarily drawn to scale unless clearly indicated otherwise. Dimensions, where shown, are typical dimensions in units of inches.

DETAILED DESCRIPTION

The present invention provides for apparatus and methods to hold a tumbler cup securely and consistently in a manner that permits rotation of the tumbler and repeatable handling of similar tumbler cups.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood the examples do not limit the broadness of the aspects of the underlying disclosure.

Embodiments in accordance with the present disclosure provide methods and apparatus for consistent and secure attachment of a spindle turner arm to a tumbler cup via a handle that is securable to the tumbler cup via a mechanism appropriate to a particular cup design.

Preferably the handle includes a receiving via or other void to receive in a spindle turner arm and secures the spindle turner arm to the handle with a set screw or other quick release fastening mechanism.

In some preferred embodiments, the present invention includes a handle that is secured to the tumbler cup by threading the handle onto a threaded portion of the tumbler cup. Typically, the threaded portion of the tumbler cup is suitable for securing a cap onto the tumbler cup. The threaded portion may include internal or external threads.

In other preferred embodiments, a handle is inserted into an interior chamber of the tumbler cup and extends plungers outward from the handle to contact the surface of the interior chamber. In some embodiments, ends of the plungers that extend outwards may include seals, such as silicon spheres that are compressed against the interior surface thereby creating a secure bond between the handle and the tumbler cup.

Still further, in some embodiments, the plungers may be user replaceable. A user may select an appropriate size plunger to exert a desired amount of pressure by the plunger against the surface of the interior chamber. A "size" of a plunger may include one or both of a length of the plunger and a surface area of the end of the plunger that extends into contact with the surface of the interior chamber, either with or without a seal.

In another aspect, in some embodiments, the plungers may be associated with a cam that is acted upon by the spindle turner arm. As the turner arm is inserted into the concentric via for receiving the turner arm, the turner arm will come into contact with the cam and as the turner arm continues into the handle, the cam will rotate and force the plunger outward towards the interior chamber surface. Preferably the outward facing end of the plunger will support a seal, such as a volume of silicone that will be compressed between the plunger and the surface of the interior chamber and thereby prevent the plunger from moving along the surface of the interior chamber as the handle is turned by the spindle turner arm.

A speed of rotation of a spindle turner arm may vary according to a procedure being performed upon the tumbler cup. Typically, the speed will be between 1 and 5 rotations per minute, with 3 rotations per minute being preferred for many procedures.

A number of plungers used to secure the handle may vary according to a design of a plunger body. Preferred embodiments include between 2 and 6 plungers, although 1 plunger is within the scope of the present invention and more than 6 plungers is also within the scope of the present invention (such as a radial spoke design).

FIG. 1 shows an assembled schematic view of a tumbler apparatus 100 illustrating some embodiments of the present invention. A spindle turner arm 101 is shown inserted into a handle 102 and fixedly attached to and secured in place with a handle securing device 103. The handle 102 is removably attachable to a tumbler cup 109. The tumbler cup 109 will include an end with a tumbler cup opening 110. The handle 102 is insertable into the tumbler cup opening 110 and removably attached to a surface of an interior chamber 111.

One modality of removably attaching the handle 102 to the tumbler cup 109 includes exerting outward pressure on the interior chamber 111 with a formable interface 105, such as, for example a silicon sphere.

As illustrated, the handle securing device 103 includes a set screw, such as, a thumb screw. Other securing devices are within the scope of the present invention such as, for example, a friction seal, a spring loaded mechanism, a pawl and detent, magnet, or other mechanical or electromechanical mechanism that may be operated by a user to fixedly attach the spindle turner arm 101 to the handle 102 types, and preferably also detach the spindle turner arm 101 from the handle 102 in response to a subsequent action by the user.

In some preferred embodiments, a gasket 112 may be used to prevent the handle 102 from being adhered to the tumbler cup 109 with one or more of the coatings applied to the tumbler cup 109 during processing while the cup 109 in on the turner arm 101. Embodiments may also include a lubricant in place of, or in addition to the gasket 112. Lubricants may include, for example, a grease, silicon, or other "wet" substance, or a dry lubricant, such as a graphite or powder type lubricant that eases separation of the handle 102 from the tumbler cup 109.

A plunger body 108 may include an upper portion 107 and a lower portion 108 which may be fastened together with a fastener (not illustrated in FIG. 1), such as a snap, threaded bolt, rivet, magnet, or other known fastener 103. The fastener 103 may be received by a threaded knurl or other receptacle. The handle 102 will be secured against the surface of an interior chamber 110 of the tumbler cup 109.

With the handle 102 secured against the surface of an interior chamber 110 of the tumbler cup 109, the spindle turner arm 101 is preferably fixedly secured to the tumbler cup 109, in a position concentric to a center of a diameter of the tumbler cup 109, such that any movement of the handle 102 and spindle turner arm 101 causes a corresponding movement of the tumbler cup 109. Movement may include, for example, rotational movement of the spindle turner arm 101 resulting in rotation of the tumbler cup 109, arcuate movement of the spindle turner arm 101 resulting in arcuate movement of the tumbler cup 109, linear movement of the spindle turner arm 101 resulting in linear movement of the tumbler cup 109, or any combination of movement types wherein a movement of the tumbler cup 109 results in a corresponding movement of the tumbler cup.

In preferred embodiments of the present invention, a position of the spindle turner arm 101 in relation to a tumbler cup 109 is repeatable between the spindle turner arm 101 (or a similar spindle arm 101) and the tumbler cup 109 (or a similar tumbler cup 109). In some embodiments, positioning of the spindle turner arm 101 in relation to a tumbler cup 109 may be aided with alignment marks 113 on one or more of the spindle turner arm 101, the handle 102, the tumbler support body 104, and the tumbler cup 109.

Figure 2:
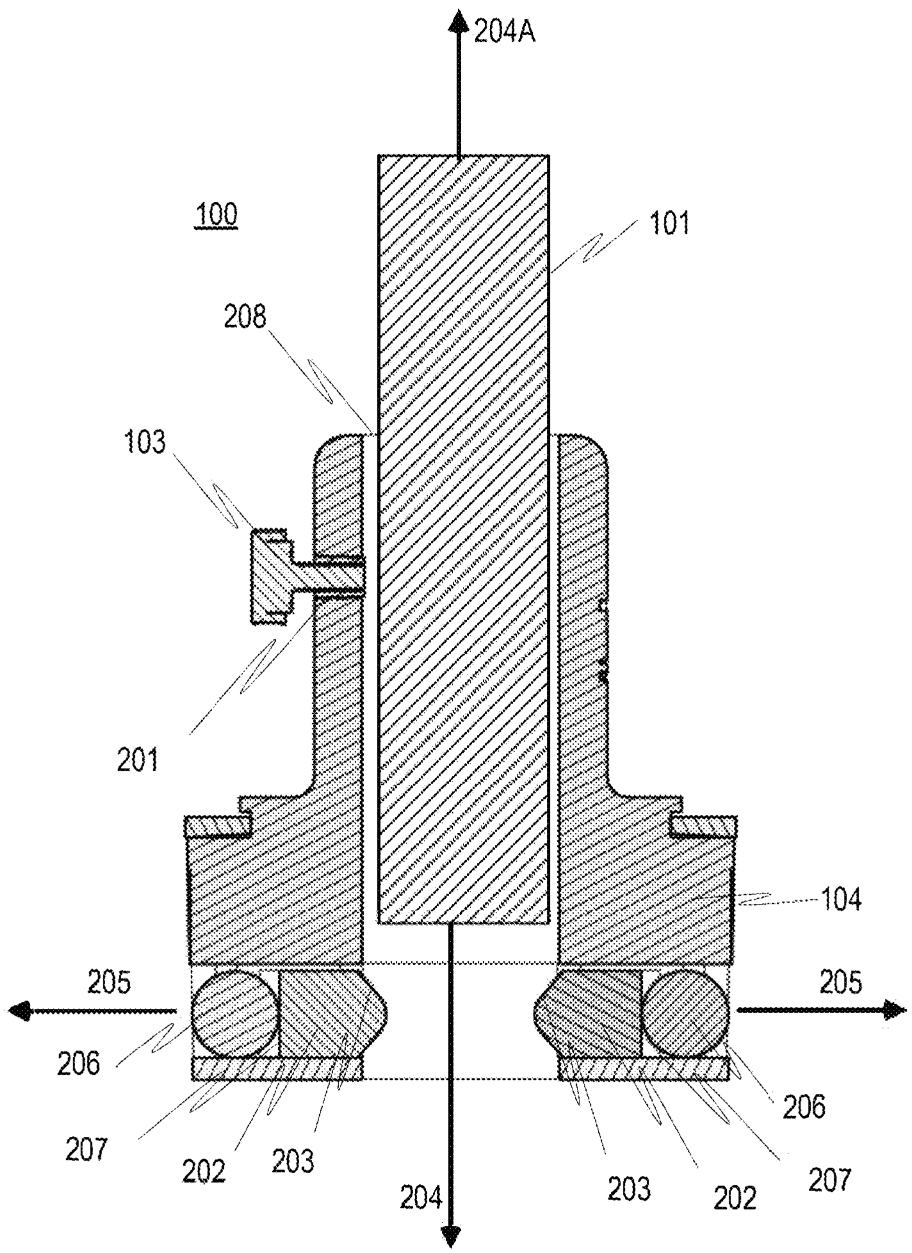
FIG. 2 illustrates a cutaway view of aspects included in the apparatus of the present invention.

Referring now to FIG. 2 illustrates a cut away view of a tumbler support 100 illustrates a spindle turner arm 101 inserted into a tumbler support body 104. A cylindrical hollow 208 is formed through the tumbler support body 104. Preferably the cylindrical hollow 208 is concentric with the tumbler support body 104. As the spindle turner arm 101 is sufficiently moved in an inward direction 204 through the cylindrical hollow 208, the spindle turner arm 101 will contact one or more plungers 202. The plungers 202 may include a cam surface 203, such as a sloped or arcuate surface. Movement of the spindle turner arm 101 against the cam surface 203 will move the plunger 202 in an outward direction 205. Movement of the spindle arm 101 in an outward direction 204A, will release pressure against the cam 203 and relax pressure against the plunger 202 (as illustrated, release outward force 205).

One or both of: a degree of sloped area on the cam surface 203; and a length of sloped area on the cam surface 203 may be used to determine and/or adjust an amount of movement of the plunger 202 in an outward direction 205 as the spindle turner arm 101 moves past the cam surface 203.

In preferred embodiments, movement of plunger 202 in an outward direction 205 as the spindle turner arm 101 moves past the cam surface 203 causes a plunger surface 207 or a formable interface 206 to contact a surface of an interior chamber (see FIG. 1 item 111). The formable surface may include, by way of non-limiting example, a silicon sphere or other composition that will move against the surface of the interior chamber and lock the plunger body in place relative to the tumbler cup. The presence of the spindle turner arm 101 against the cam surface 203 provides sufficient outward 205 force to maintain the relative positions of the tumbler cup 109, the tumbler support body 104 and the spindle turner arm 101 so that the tumbler cup 109, the tumbler support body 104 and the spindle turner arm 101 may be moved and manipulated as if they were a single contiguous item.

A set screw 103 may extend through a set screw aperture 201 such that the set screw (illustrated as a knurled screw) may be rotated until it contacts the spindle turner arm and fixedly secures the spindle turner arm to the tumbler support body 104.

Figure 3:
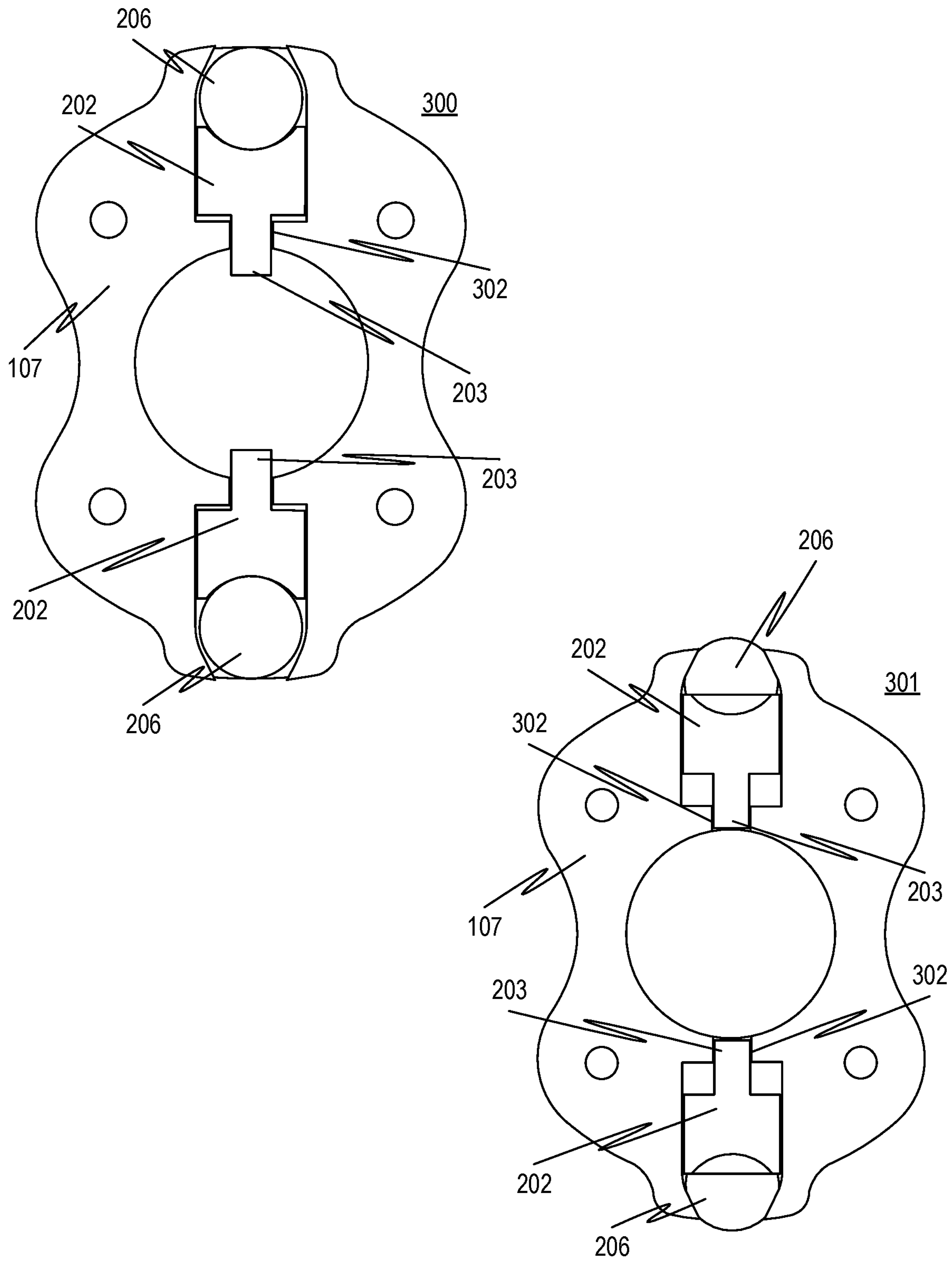
FIG. 3 illustrates a top down view of a lower portion of the handle with an exterior threaded portion.

FIG. 3 illustrates a top down view of a lower portion of the tumbler support body 104. The plunger 202 plungers and corresponding formable interfaces 206 may be in an inactive state 300 or in an active state 301. The inactive state 300 allows the tumbler cup 109, the tumbler support body 104 and the spindle turner arm 101 to move independently of each other. The inactive state 300 refers to the formable interface 206 being retracted within the perimeter of the lower portion of the tumbler support body 104.

The active state 301 fixedly attaches the tumbler cup 109, the tumbler support body 104 and the spindle turner arm 101 to each other and allows the tumbler cup 109, the tumbler support body 104 and the spindle turner arm 101 to be manipulated as a single unit. The active state 301 is indicative of the formable interface 206 being extended outward from the perimeter of the lower portion of the tumbler support body 104.

In some embodiments, the sloped cam surface 203 may be guided by a cam guide 302 to maintain a correct position of the plunger 202 during movement initiated by contact between the plunger and the sloped cam surface 203.

Figure 4:
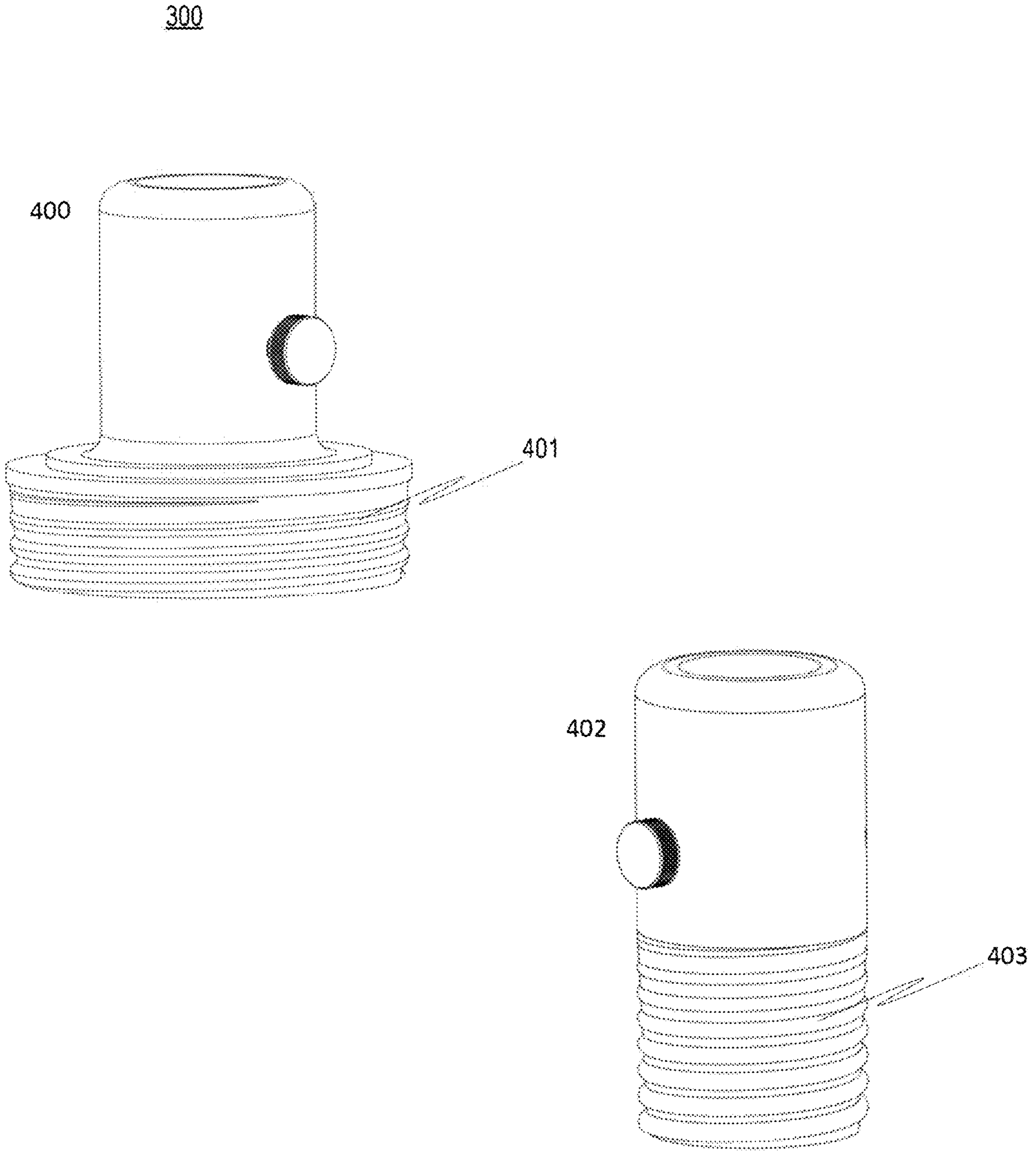
FIG. 4 illustrates a perspective view of wide mouth tumbler support with an exterior wide mouth handle thread 401 and a bullet tumbler support with an exterior handle thread.

FIG. 4 illustrates a perspective view of wide mouth tumbler support 400 with an exterior wide mouth handle thread 401 and a bullet tumbler support 402 with an exterior handle thread 403. The exterior wide mouth handle thread 401 may be used to removably connect the wide mouth tumbler support 400 to a wide mouth tumbler cup (not shown in FIG. 4). The bullet handle thread 403 may be used to removably connect the bullet tumbler support 402 to a bullet mouth tumbler cup (not shown in FIG. 4). In different embodiments, the wide mouth thread 401 or the bullet mouth handle thread 403 may be used individually or in combination with a plunger apparatus described in FIG. 1 through FIG. 3 to fixedly connect a spindle turner arm 101 *not shown in FIG. 4) with a tumbler cup. The exterior threaded portion 401 may thread into an interior threaded portion of a tumbler cup (not illustrated in FIG. 4) to secure the wide mouth tumbler support to a tumbler cup.

Figure 5:
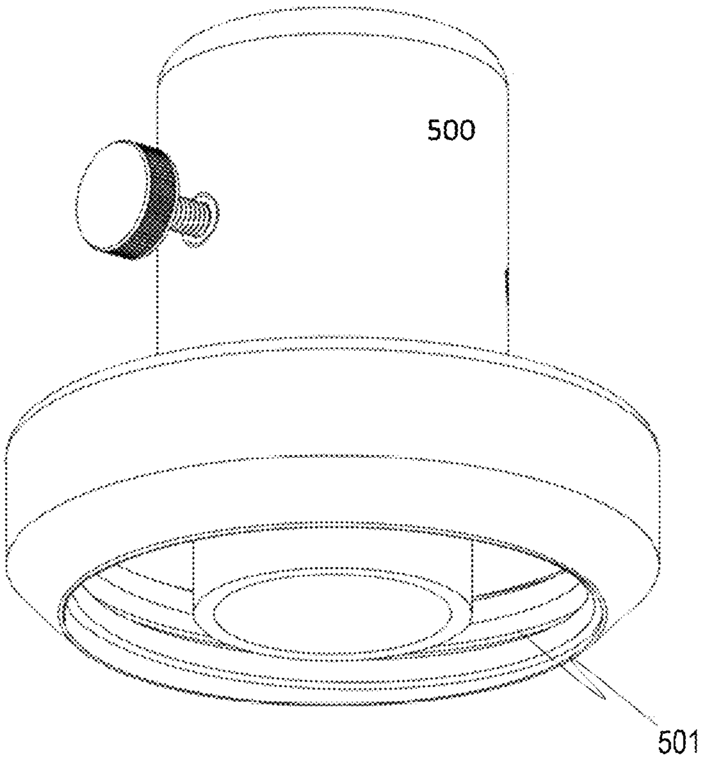
FIG. 5 illustrates a perspective view wide mouth tumbler support with an interior wide mouth handle thread according to some embodiments of the present invention.

FIG. 5 illustrates a perspective view of wide mouth tumbler support 500 with an interior wide mouth handle thread 501. The exterior wide mouth handle thread 501 may be used to removably connect the wide mouth tumbler support 500 to a wide mouth tumbler cup (not shown in FIG. 5). In various embodiments, a wide mouth thread 501 may be used individually or in combination with a plunger apparatus described in FIG. 1 through FIG. 3 to fixedly connect a spindle turner arm 101 *not shown in FIG. 5) with a tumbler cup. An interior threaded handle thread 501 may thread into an exterior threaded portion of a tumbler cup (not illustrated in FIG. 4) to secure the handle 400 to the tumbler cup.

By way of non-limiting example, an interior wide mouth, exterior bullet thread, or an interior thread design may be used to connect a tumbler cup with a tumbler support with or without a plunger device.

Figure 6:
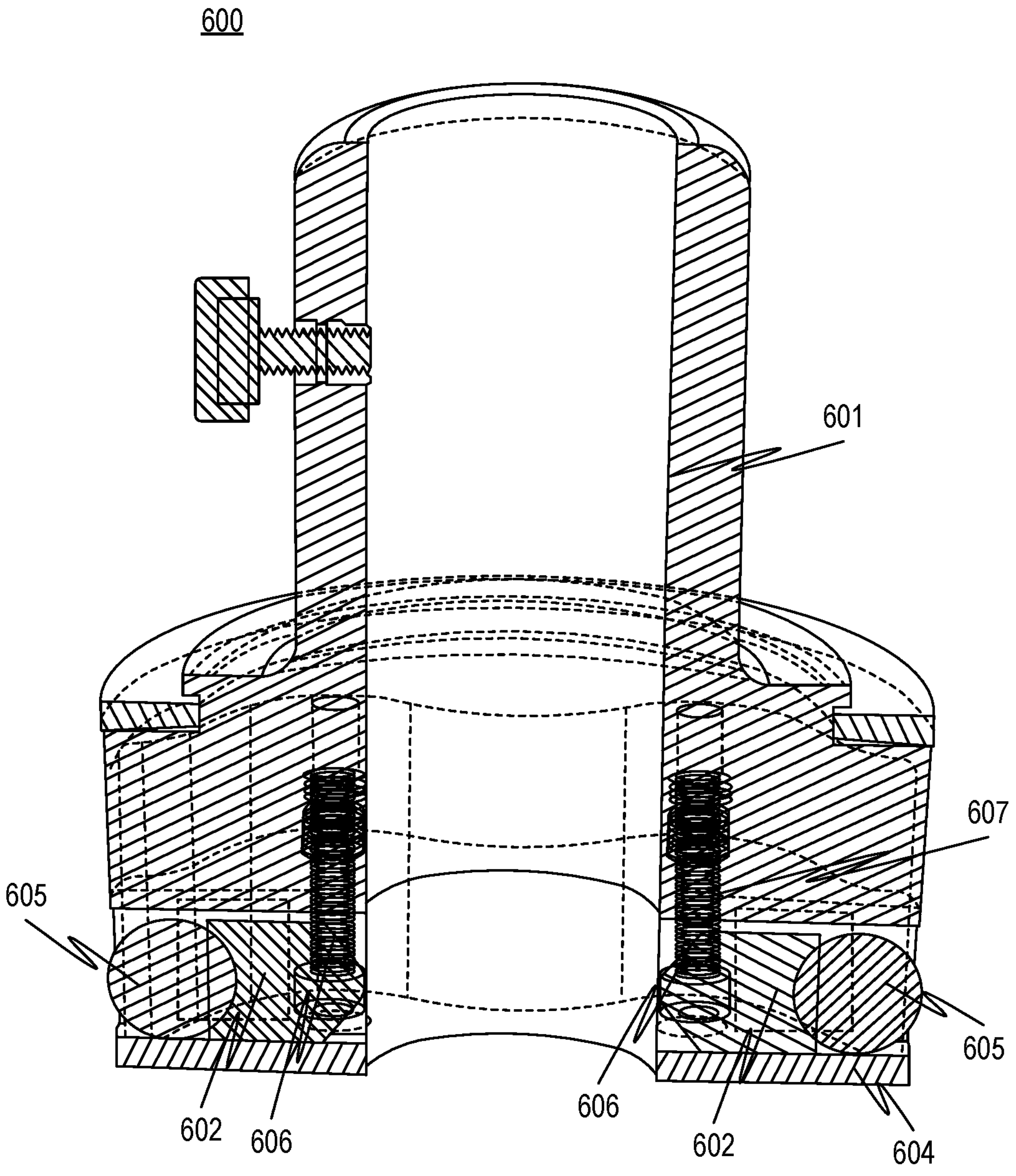
FIG. 6 illustrates a cutaway view of a handle, with a body, housing plungers, and silicon seals according to some embodiments of the present invention.

FIG. 6 illustrates a cutaway view of a handle 600 with a body 601 housing plungers 602 and silicon seals 603; and springs 606-607 enabling spring loaded plungers 602. The plungers 602 and seal 603 may be secured in the body 601 with a lower plate 604 that are held in place with fasteners (such as a threaded bolt) secured into a receiver (such as a threaded knurl). A gasket may also be included to prevent bonding of the handle 601 to a tumbler cup (not shown in FIG. 6).

Figure 7:
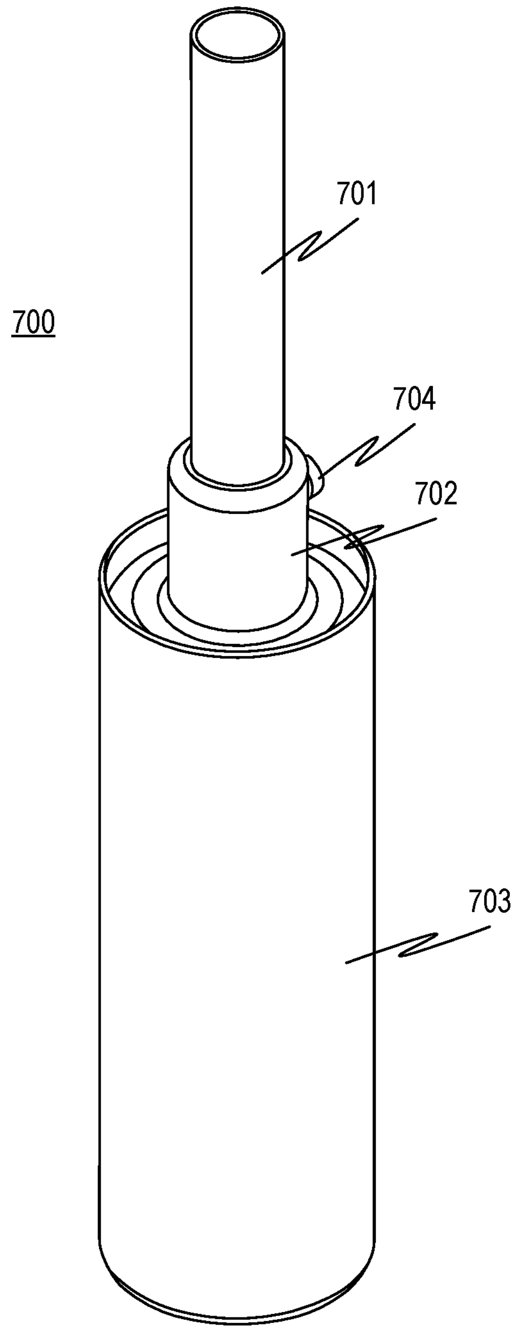
FIG. 7 illustrates an assembled tumbler support system according to some embodiments of the present invention.

Referring now to FIG. 7, a tumbler support system 700 in an assembled state with a spindle turner arm 701 inserted into an engaged handle 702 and fixedly attached to the engaged handle 702 via a set screw that includes a set screw 704. The engaged handle 702 is fixedly attached to a supported tumbler cup 703 through one or more of the fastening mechanisms described herein, which may include one or both of: an activated plunger mechanism and a handle thread.

Figure 8:
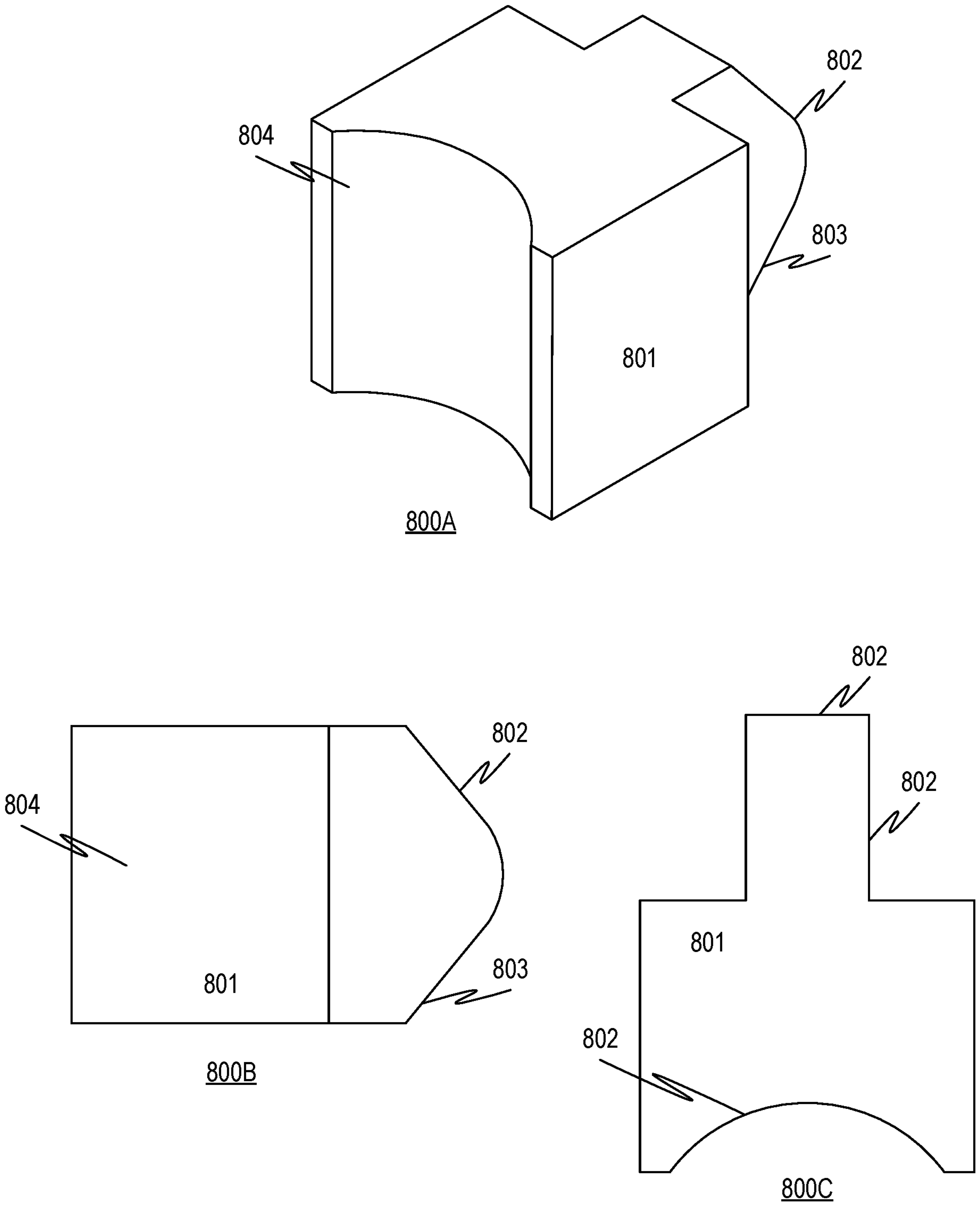
FIG. 8 illustrates a multiple views of exemplary loungers.

Referring now to FIG. 8, multiple views 800A-800C of a plunger 801 illustrate aspects of the plunger 801, including: a plunger 801, a cam apex 802, a cam nadir (low point) 803, and a cam recess 804. The cam recess 804 may be used to position a formable interface, such as a silicon sphere, textured surface, or other suitable device for engaging an interior surface of a tumbler cup.

Figure 9:
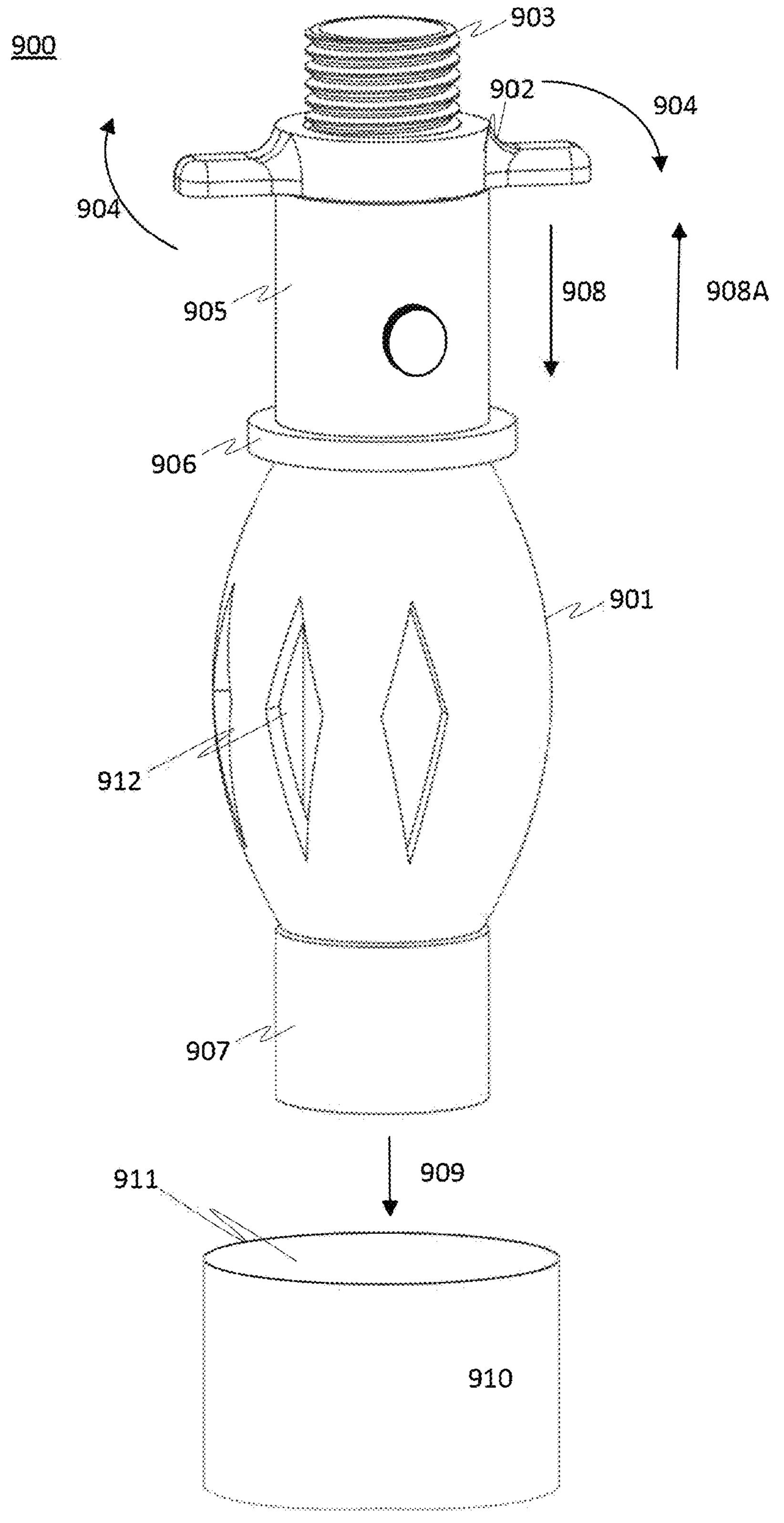
FIG. 9 illustrates a schematic diagram of a tumbler support system with a bladder according to some embodiments of the present invention.

Referring now to FIG. 9, a schematic diagram of a first compression activated tumbler support system 900 is illustrated. A compression activated bladder 901 may be sized to fit into an interior of a tumbler cup 910 when the compression activated bladder 901 is moved in a direction inward 909 into the interior of a tumbler cup 910. The compression activated bladder 901 may be solid or include stress relief cutouts 912 that facilitate expansion and compression of the compression activated bladder 901 that follows a desired shape pattern.

Compression and decompression of the compression activated bladder 901 may be accomplished by rotating a compression yoke 902 (such as clockwise rotation 904 to move the compression yoke 902 in a compressive direction 908. In some embodiments, the compression yoke 902 will move an upper compression collar 905 against a grommet 906. In some preferred embodiments, a diameter of the grommet 906 will just slightly less than a diameter of an interior surface 912 of a tumbler cup 910. With a diameter matching the interior surface 912 of the tumbler cup 910, the upper grommet 906 may be inserted with the compression activated tumbler support 900 into the tumbler cup 910 and be positioned concentrically with the tumbler cup 910.

A lower compression collar 907 may be a same diameter or smaller diameter than the upper collar. A smaller diameter facilitates ease of insertion of the compression activated tumbler support 900 into the tumbler cup 910. The lower compression collar 907 may be brought closer to the upper compression collar 905 when the compression yoke 902 is rotated and moves the upper compression collar 906 in a compression direction 908.

Expansion of the expansion bladder 901 while the expansion bladder 901 is inserted into the tumbler cup 910, causes the expansion bladder to apply outward pressure against the tumbler cup interior surface 911 and fixedly attached the compression activated tumbler support 900 to the tumbler cup in a repeatable fashion.

It is noted that rotating the compression yoke 902 in a rotational direction opposite to at direction for compression (such as, for example, in a counterclockwise direction), will allow the compression collar 905 to move in a decompression direction 908A and release the outward pressure of the bladder 901 against the against the tumbler cup interior surface 911 so that the compression activated tumbler support 900 is removably attached while in the compressive state.

Figure 10:
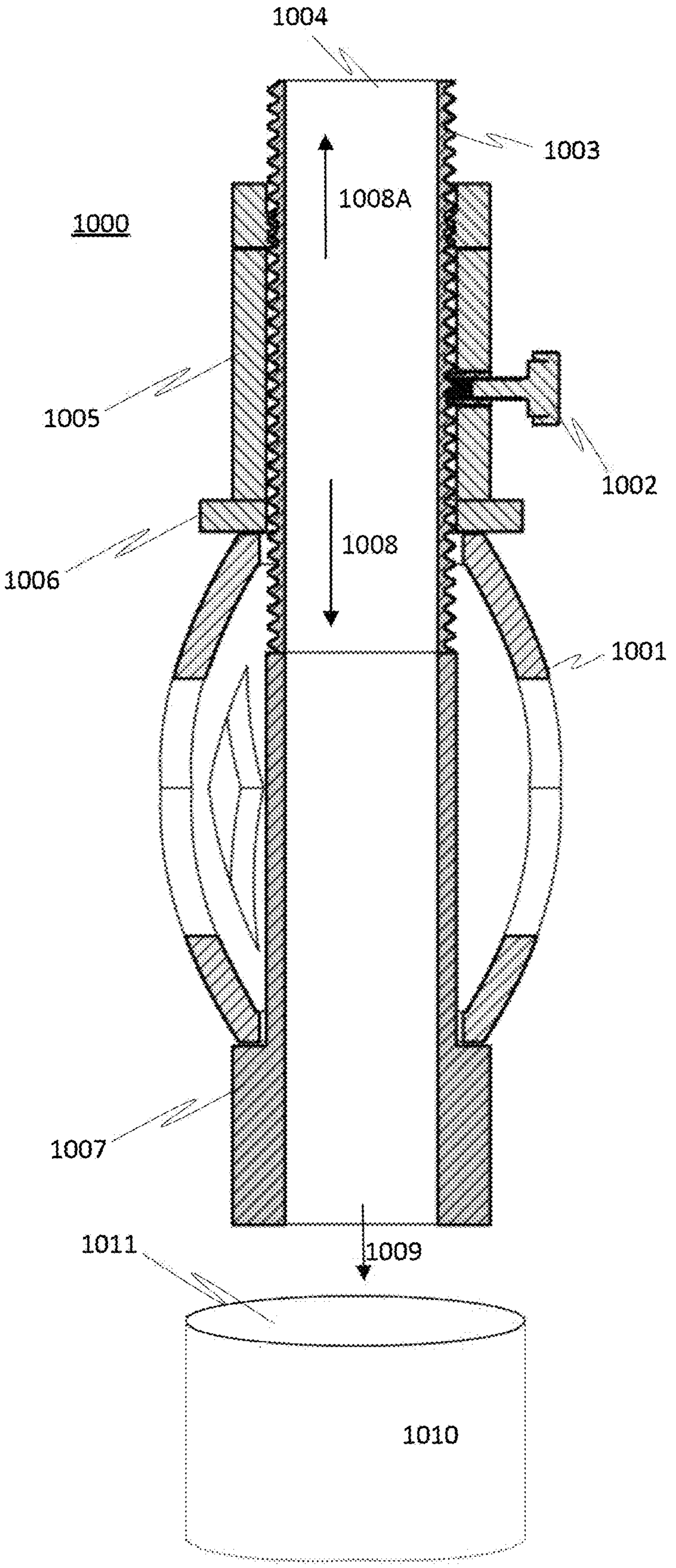
FIG. 10 illustrates a schematic diagram of an alternate tumbler support system with a bladder according to some embodiments of the present invention.

Referring now to FIG. 10, a schematic diagram of a second compression activated tumbler support system 1000 is illustrated. A compression activated bladder 1001 may be sized to fit into an interior of a tumbler cup 1010. The compression activated bladder 1001 may be solid or include stress relief cutouts 1012 that facilitate expansion and compression of the compression activated bladder 1001 that follows a desired shape pattern.

Compression and decompression of the compression activated bladder 1001 may be accomplished by disengaging a detent engagement device 1022 from interacting with a detent 1003 and sliding the spindle turner arm 1004 in a direction of compression 1008. With the spindle turner arm 1004 in a position with a desired amount of compression achieved, the detent engagement device 1022, may be placed in a position to engage a detent 1003.

If the second compression activated tumbler support system 1000 is to be placed in a state of decompression, the detent engagement device may be disengaged from interacting with any detent and the sliding the spindle turner arm 1004 may be moved in a direction of decompression 1008A. Moving the compression collar 1005 in a decompression direction 1008A will release the outward pressure of the bladder 1001 against the against the tumbler cup interior surface 1011 so that the compression activated tumbler support 1000 is removably attached while in the compressive state.

In some embodiments, the compression yoke 1002 will move an upper compression collar 1005 against a grommet 1006. In some preferred embodiments, a diameter of the grommet 1006 will just slightly less than a diameter of an interior surface 1012 of a tumbler cup 1010. With a diameter matching the interior surface 1012 of the tumbler cup 1010, the upper grommet 1006 may be inserted with the compression activated tumbler support 1000 into the tumbler cup 1010 and be positioned concentrically with the tumbler cup 1010.

A lower compression collar 1007 may be a same diameter or smaller diameter than the upper compression collar 1006. A smaller diameter facilitates ease of insertion of the compression activated tumbler support 1000 into the tumbler cup

1010. The lower compression collar 1007 may be brought closer to the upper compression collar 1005 when the compression yoke 1002 is rotated and moves the upper compression collar 1006 in a compression direction 1008.

Expansion of the expansion bladder 1001 while the expansion bladder 1001 is inserted into the tumbler cup 1010, causes the expansion bladder to apply outward pressure against the tumbler cup interior surface 1011 and fixedly attached the compression activated tumbler support 1000 to the tumbler cup in a repeatable fashion.

Figure 11:
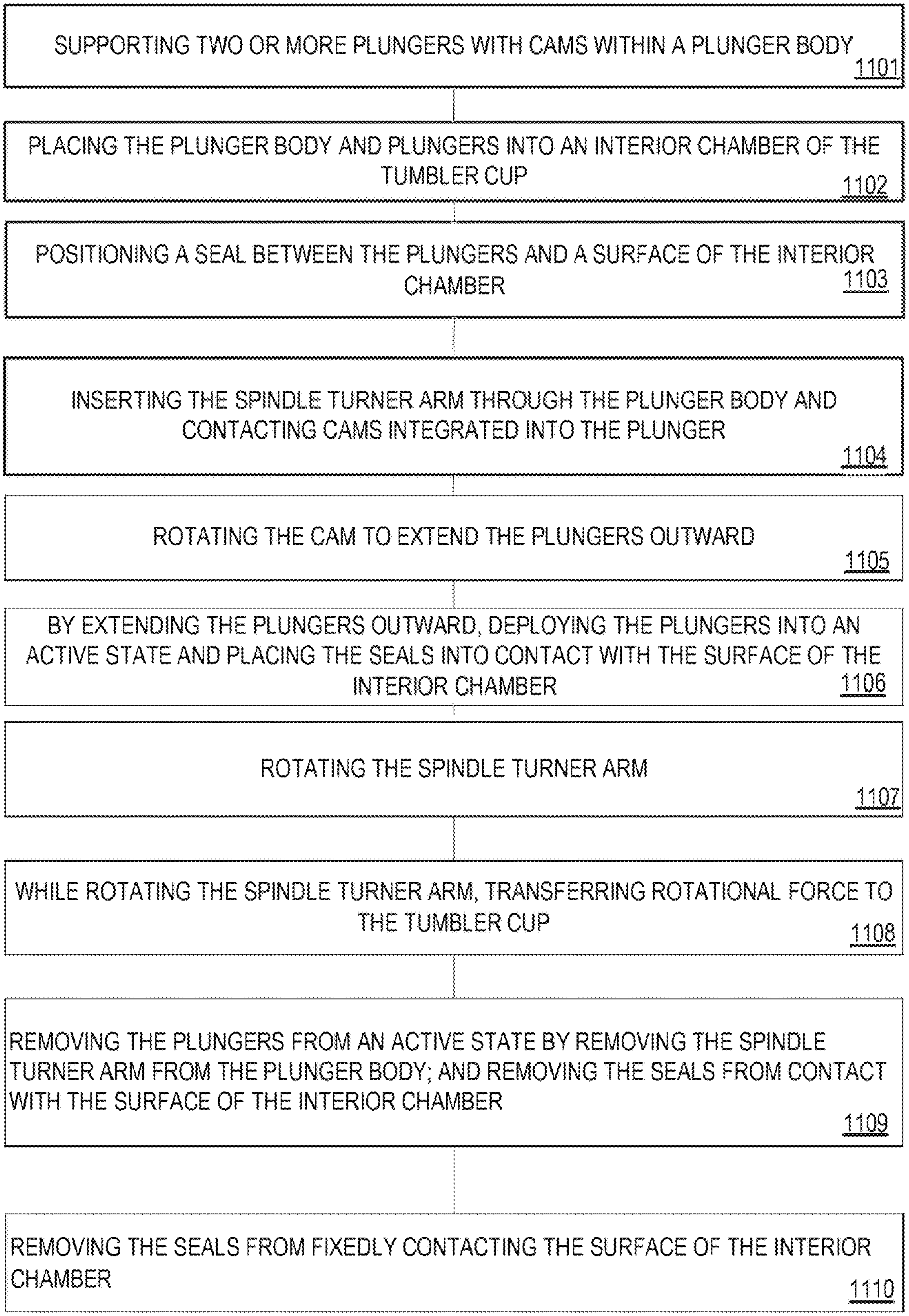
FIG. 11 illustrates method steps that may be completed in some embodiments of the present invention.

[1] FIG. 11 illustrates method steps that may be executed in some embodiments of the present invention. In one general aspect, referring now to FIG. 11 methods of the present invention may include, at step 1101, supporting two or more plungers within a plunger body. At step 1102, the method may also include placing the plunger body and plungers into an interior chamber of the tumbler cup.

[2] At step 1103, the method may furthermore include positioning a seal between the plungers and a surface of the interior chamber.

[3] At step 1104, the spindle turner arm may be inserted through the plunger body thereby contacting cams integrated into the plunger.

[4] At step 1105 the method may include rotating the cam to extend the plungers outward.

[5] At step 1106 the plungers may be extended outward, deploying the plungers into an active state and placing the seals into contact with the surface of the interior chamber.

[6] At step 1107 the method may furthermore include rotating the spindle turner arm such that at step 1108 while rotating the spindle turner arm, rotational force may be transferred to the tumbler cup.

[7] At step 1109, the plungers may be removed from an active state by removing the spindle turner arm from the plunger body.

[8] At step 1110 the seals the seals from fixedly contacting the surface of the interior chamber.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring such operations be performed in the particular order shown or in a sequential order, or all illustrated operations be performed, to achieve desirable results.

Certain features described in this specification in the context of separate embodiments can also be implemented in combination in a single embodiment. Conversely, various features described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood the described program components and systems can generally be integrated together in a single software product or packaged into multiple software products.

Thus, particular embodiments of the subject matter have been described. Other embodiments are within the scope of the disclosure. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the disclosure.

In certain implementations, multitasking and parallel processing may be advantageous. Nevertheless, it will be understood that various modifications may be made without departing from the spirit and scope of the disclosure.

What is claimed is:

1. A method for supporting a tumbler cup on a spindle turner arm, the method comprising the steps of:

a. supporting a plunger within a tumbler support body;

b. placing the tumbler support body and the plunger into an interior chamber of the tumbler cup;

c. positioning a seal between the plunger and a surface of the interior chamber;

d. inserting the spindle turner arm through a cylindrical hollow in the tumbler support body;

e. contacting a cam with the spindle turner arm;

f. pushing the spindle turner arm past the cam causing the plunger to move outward towards the surface of the interior chamber;

g. by extending the plunger outward, deploying the plunger into an active state and placing the seal into contact with the surface of the interior chamber;

h. rotating the spindle turner arm; and i. as a result of the rotating the spindle turner arm, transferring rotational force to the tumbler cup.

2. The method of claim 1 additionally comprising the step of maintaining a minimal amount of outward force with the seal placed in contact with the surface of the interior chamber.

3. The method of claim 2 further comprising the step of performing steps a. through g. for multiple cams and corresponding plungers.

4. The method of claim 3 further comprising the step of removing the corresponding plungers from the active state by removing the spindle turner arm from the tumbler support body; and reducing that amount of outward force by seals in contact with the surface of the interior chamber.

5. The method of claim 4 wherein each corresponding plunger and a respective cam are integrated.

6. The method of claim 5 wherein the respective cam comprises a slope surface and the method further comprises contacting the slope surface with the spindle turner arm and moving the respective cam outward towards the surface of the interior chamber as a result of the contact of the slope with the spindle turner arm.

7. The method of claim 6 wherein the tumbler support body is connected to a handle and the method additionally comprises the step of securing the spindle turner arm to the handle and the tumbler support body with a fastener.

8. The method of claim 6 additionally comprising the step of reproducing a tumbler cup support experience via aligning the tumbler support body to the handle with reference to alignment marks on the handle.

9. The method of claim 8 additionally comprising placing a gasket between the tumbler support body and the tumbler cup.

10. The method of claim 9 wherein the tumbler support body comprises an upper portion and a lower portion, the lower portion encompassing the corresponding plunger and the respective cam, and the method further comprises securing the lower portion to the upper portion with one or more screws.

11. A tumbler cup support apparatus comprising:

a. a tumbler support body comprising a cylindrical hollow;

b. a spindle turner arm insertable into the cylindrical hollow;

c. a plunger supported by the tumbler support body, the plunger having a first plunger end directed towards the cylindrical hollow and a second plunger end directed towards a perimeter of the tumbler support body;

d. a cam integrated into the first plunger end, the cam being placed in contact with the spindle turner arm when the spindle turner arm is inserted into the cylindrical hollow; and e. a formable interface in contact with a second plunger surface and movable against a surface of an interior chamber of a tumbler cup.

12. The tumbler cup support apparatus of claim 11 additionally comprising a set screw through the tumbler support body, the set screw adjustable to secure the spindle turner arm to the tumbler support body.

13. The tumbler cup support apparatus of claim 11 wherein the formable interface comprises a silicon sphere.

14. The tumbler cup support apparatus of claim 13 additionally comprising a gasket between the tumbler support body and the tumbler cup.

15. The tumbler cup support apparatus of claim 13 wherein the tumbler support body comprises an upper portion and a lower portion, the lower portion encompassing the plunger and the silicon sphere.

16. The tumbler cup support apparatus of claim 15 wherein the lower portion of the tumbler support body is fixedly attached to the upper portion of the tumbler support body.

17. The tumbler cup support apparatus of claim 15 alignment marks on the handle for reproducing a tumbler cup support experience.

18. The tumbler cup support apparatus of claim 11 additionally comprising an exterior thread suitable for attachment of the tumbler cup support apparatus to the tumbler cup.

19. The tumbler cup support apparatus of claim 11 additionally comprising an interior thread suitable for attachment of the tumbler cup support apparatus to the tumbler cup.

20. The tumbler cup support apparatus of claim 11 wherein the cam is integrated into the first plunger end and the formable interface in contact with the second plunger surface are replaced with a bladder.

* * * * *